US012070953B2

(12) United States Patent
Fukasawa

(10) Patent No.: US 12,070,953 B2
(45) Date of Patent: Aug. 27, 2024

(54) INK PACK AND METHOD OF MANUFACTURING THE INK PACK

(71) Applicant: SEIKO EPSON CORPORATION, Tokyo (JP)

(72) Inventor: Noriyuki Fukasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 102 days.

(21) Appl. No.: 17/986,143

(22) Filed: Nov. 14, 2022

(65) Prior Publication Data

US 2023/0150269 A1 May 18, 2023

(30) Foreign Application Priority Data

Nov. 15, 2021 (JP) ................................ 2021-185443

(51) Int. Cl.
*B41J 2/175* (2006.01)

(52) U.S. Cl.
CPC ....... *B41J 2/17533* (2013.01); *B41J 2/17513* (2013.01); *B41J 2/1752* (2013.01); *B41J 2002/17516* (2013.01)

(58) Field of Classification Search
CPC ................ B41J 2/17513; B41J 2/17523; B41J 2/17559; B41J 2/1752; B41J 2/17506; B41J 2/17509; B41J 2/17503; B41J 2/17553; B41J 2/17556; B41J 2002/17516
See application file for complete search history.

(56) References Cited

U.S. PATENT DOCUMENTS

| | | | | |
|---|---|---|---|---|
| 5,307,091 A * | 4/1994 | DeCoste, Jr. | ........ B41J 2/17506 | 347/86 |
| 6,116,723 A * | 9/2000 | Childers | ............. B41J 2/17513 | 347/85 |
| 2011/0057997 A1 * | 3/2011 | Takeuchi | ............ B41J 2/17553 | 29/428 |

FOREIGN PATENT DOCUMENTS

| | | |
|---|---|---|
| JP | 2008-200971 A | 9/2008 |

* cited by examiner

*Primary Examiner* — Kristal Feggins
(74) *Attorney, Agent, or Firm* — Oliff PLC

(57) ABSTRACT

An ink pack configured to supply an ink to an ink-consuming apparatus includes a first pack configured to contain the ink, an ink supplying section provided to the first pack, the ink supplying section being configured to supply the ink to the ink-consuming apparatus, and a second pack configured to accommodate the first pack. The first pack and the second pack are separable.

10 Claims, 7 Drawing Sheets

INK PACK AND METHOD OF MANUFACTURING THE INK PACK

The present application is based on, and claims priority from JP Application Serial Number 2021-185443, filed Nov. 15, 2021, the disclosure of which is hereby incorporated by reference herein in its entirety.

BACKGROUND

1. Technical Field

The present disclosure relates to an ink pack and a method of manufacturing the ink pack.

2. Related Art

Ink cartridges that include an ink pack and a case that accommodates the ink pack, for example, an ink cartridge described in JP-A-2008-200971, are known.

The ink pack in such an ink cartridge is protected by the case. The case, however, uses a large amount of plastic material, and carbon dioxide emissions in manufacturing the case are high. In addition, in reusing the used ink cartridge, when the ink pack is damaged, the whole ink pack is to be replaced with a new one, resulting in a lower ink-pack reuse rate.

SUMMARY

An ink pack configured to supply an ink to an ink-consuming apparatus includes a first pack configured to contain the ink, an ink supplying section provided to the first pack, the ink supplying section being configured to supply the ink to the ink-consuming apparatus, and a second pack configured to accommodate the first pack, in which the first pack and the second pack are separable.

A method of manufacturing an ink pack including a first pack configured to contain an ink, an ink supplying section provided to the first pack, the ink supplying section being configured to supply the ink to the ink-consuming apparatus, and a second pack configured to accommodate the first pack is provided. The method includes accommodating the first pack filled with the ink by using the second pack, and reducing the pressure in a space between the first pack and the second pack such that the first pack and the second pack come into close contact with each other.

A method of manufacturing a new ink pack by reusing a part of the ink pack manufactured in accordance with the manufacturing method according to the above-described manufacturing method is provided. The method includes, in a state in which the first pack and the second pack are in close contact, injecting air into a space between the first pack and the second pack to separate the first pack and the second pack, separating the first pack and the second pack from each other, and replacing the first pack or the second pack with a new first pack or a new second pack.

A method of manufacturing an ink pack including a first pack configured to contain an ink, an ink supplying section provided to the first pack, the ink supplying section being configured to supply the ink to the ink-consuming apparatus, and a second pack configured to accommodate the first pack is provided. The method includes accommodating the first pack filled with the ink by using the second pack, and injecting air into a space between the first pack and the second pack to form an air layer between the first pack and the second pack.

A method of manufacturing a new ink pack by reusing a part of the ink pack manufactured in accordance with the manufacturing method according to the above-described method is provided. The method includes separating the first pack and the second pack from each other, and replacing the first pack or the second pack with a new first pack or a new second pack.

DESCRIPTION OF EXEMPLARY EMBODIMENTS

1. First Embodiment

Figure 1:
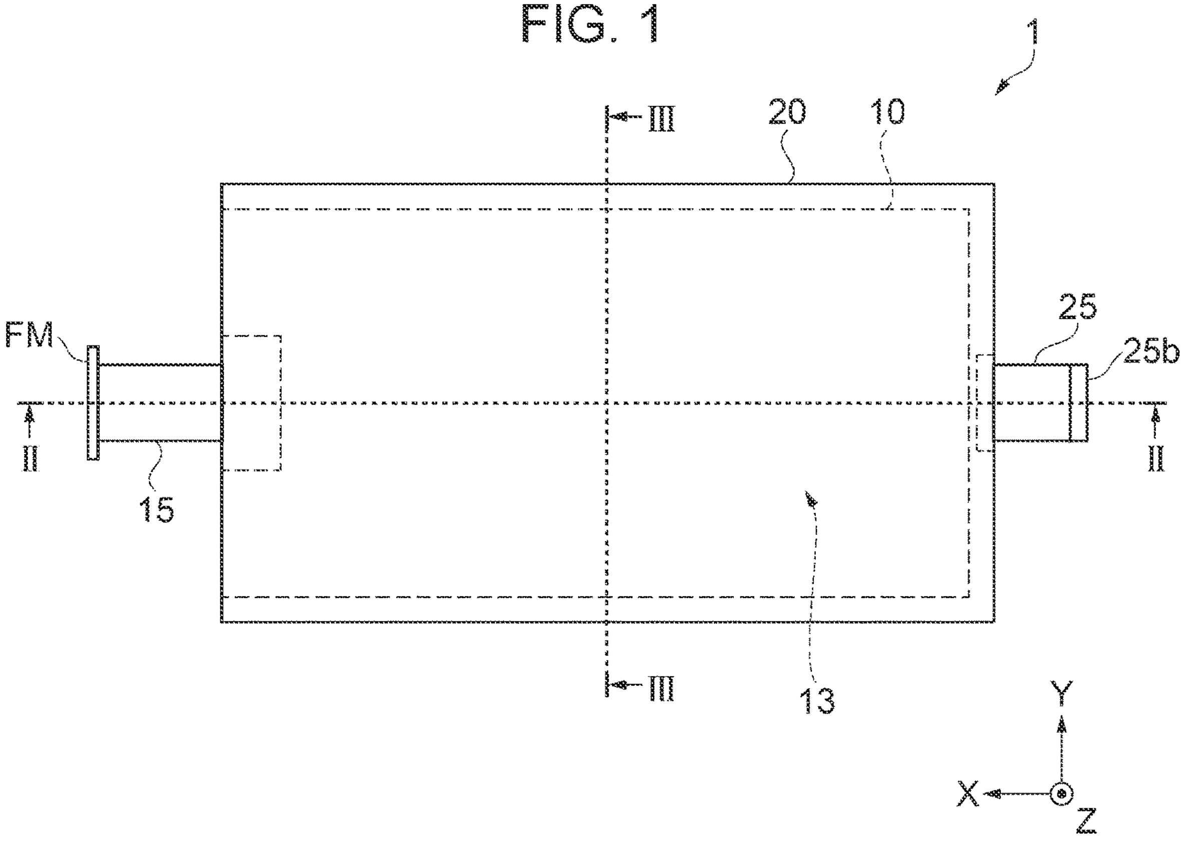
FIG. 1 is a plan view illustrating an ink pack according to a first embodiment.
Figure 2:
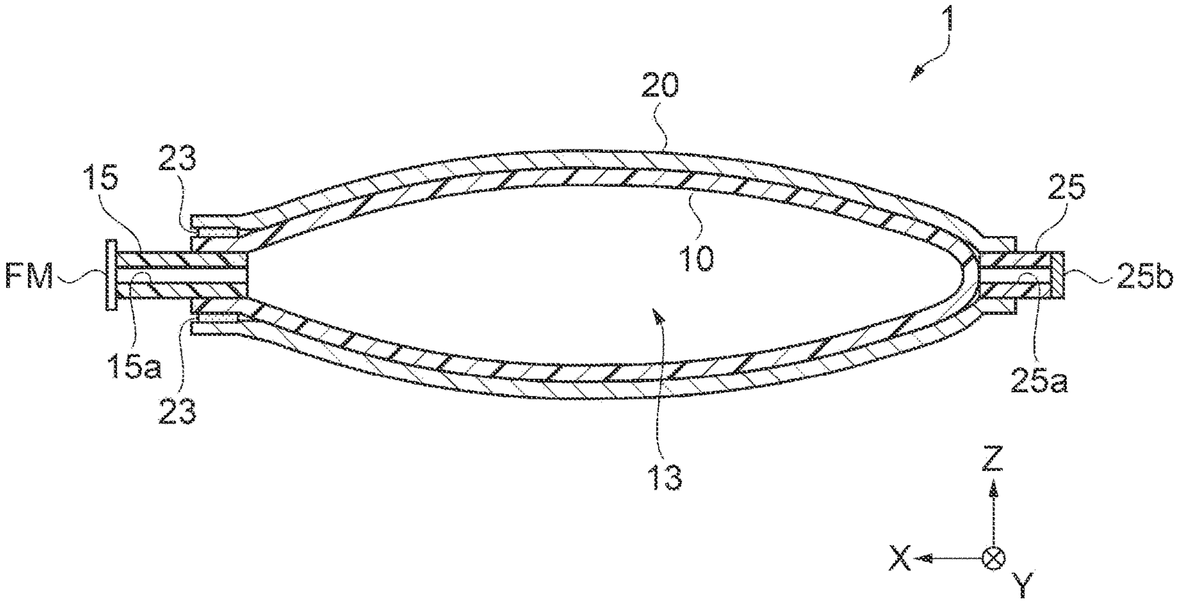
FIG. 2 is a cross-sectional view illustrating the ink pack according to the first embodiment.

First, a configuration of an ink pack 1 is described. The ink pack 1 is an ink container that contains an ink to be supplied to a printer, which is an ink-consuming apparatus. The ink pack 1 includes a first pack 10 that can contain an ink and a second pack 20 that can accommodate the first pack 10, as illustrated in FIG. 1, FIG. 2 (a cross-sectional view taken along line II-II in FIG. 1), and FIG. 3 (a cross-sectional view taken along line III-III in FIG. 1).

The ink pack 1 according to the embodiment has a substantially rectangular outer peripheral portion elongated in the X-axis direction in plan view. The dimension of the ink pack 1 in the Z-axis direction is shorter than the dimension in the X-axis direction and shorter than the dimension in the Y-axis direction. In other words, the ink pack 1 has a plate-like shape that is thin in the Z-axis direction. Accordingly, the XY plane of the ink pack 1 is used as a mounting surface in the printer, enabling the user to stably install the ink pack 1.

The first pack 10 is a pouch containing a container 13 for ink. The flexible first pack 10 is made of a sheet member. The first pack 10 may be flexible enough to bend under its own weight or may be flexible enough to retain its shape under its own weight but bend under a load exceeding its own weight. The first pack 10 is substantially rectangular and elongated in the X-axis direction in plan view. The first pack 10 according to the embodiment is formed in a pouch shape by folding a sheet member, overlapping the outer peripheral portion at the end in the −Y direction and the outer peripheral portion at the end in the +Y direction, and welding the respective outer peripheries.

The sheet member of the first pack 10 is made of a flexible material. The sheet member is a film member made of, for example, polyethylene terephthalate (PET), nylon, or polyethylene. The sheet member may be made of stacked films of the above-described material. For example, the sheet member may include an outer layer made of a high-impact film of PET or nylon and an inner layer made of an ink-resistant film of polyethylene.

An ink supplying section 15 is attached to a +X-direction end of the first pack 10. The ink supplying section 15 has a tubular shape. Part of the outer circumferential surface of the ink supplying section 15 is welded to the sheet member of the first pack 10. The ink supplying section 15 has a supply path 15*a* that communicates with the container 13 of the first pack 10 and the outside. The supply path 15*a* is provided in the X-axis direction. The ink contained in the first pack 10 can be supplied to a printer via the supply path 15*a*. The ink supplying section 15 is a resin member made of, for example, polypropylene. A film member FM is attached to a +X-direction end of the ink supplying section 15. The film member FM seals the supply path 15*a* to seal the ink contained in the first pack 10. To supply the ink to a printer, the film member FM is removed or pierced to open the supply path 15*a*, thereby supplying the ink contained in the first pack 10 to the printer. It should be noted that the sheet members are welded to each other at the +X-direction end of the first pack 10 other than the area of the ink supplying section 15.

The second pack 20 is a pouch that accommodates the first pack 10 and is larger than the first pack 10. Accordingly, the whole of the first pack 10 is covered with the second pack 20. The flexible second pack 20 is made of a sheet member. The second pack 20 may be flexible enough to bend under its own weight or may be flexible enough to retain its shape under its own weight but bend under a load exceeding its own weight. The second pack 20 is substantially rectangular and elongated in the X-axis direction in plan view.

Figure 3:
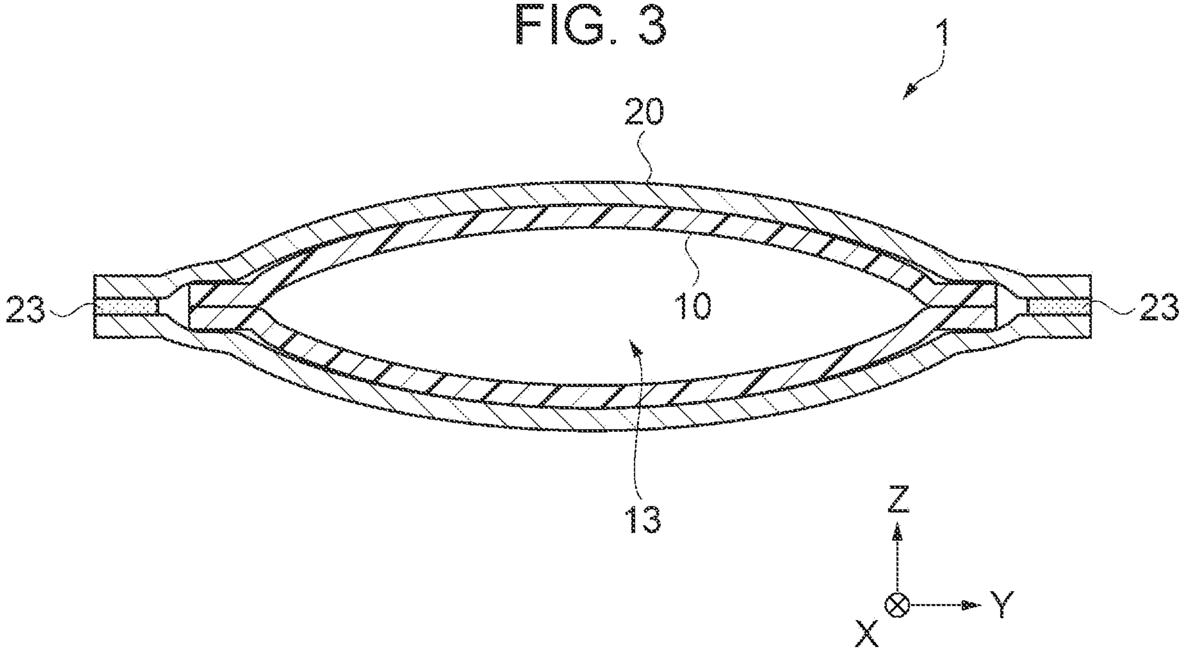
FIG. 3 is a cross-sectional view illustrating the ink pack according to the first embodiment.

The ink pack 1 according to the embodiment includes the first pack 10 and the second pack 20, which are separable. The second pack 20 according to the embodiment includes two sheet members that overlap each other. Part of an outer peripheral portion of the second pack 20 is bonded with a double-sided tape 23, which is a removable member. In this embodiment, two sheet members overlap each other, and the outer peripheral portions at the −Y-direction end and the outer peripheral portions at the +Y-direction end are bonded with the double-sided tapes 23 (FIG. 3). At the +X-direction end of the second pack 20, the front surface of the sheet member of the first pack 10 and the rear surface of the sheet member of the second pack 20 are bonded with the double-sided tape 23 (FIG. 2).

The second pack 20 has a pressure-reducing section 25. The pressure-reducing section 25 according to the embodiment is disposed at the −X-direction end of the second pack 20. The pressure-reducing section 25 has a tubular shape. At the −X-direction end of the second pack 20, part of the pressure-reducing section 25 is welded in a state in which the pressure-reducing section 25 is held between the two sheet members. In the second pack 20, the portion (the outer peripheral portion of the second pack 20 other than the −X-direction end) bonded with the double-sided tape 23 can be readily removed by pulling the sheet member with fingers. This structure enables the second pack 20 to be readily opened, and thus the first pack 10 and the second pack 20 can be separated. The removable member may be, for example, an easy-peel film that can be readily separated.

The pressure-reducing section 25 is configured to reduce the pressure in the space between the first pack 10 and the second pack 20. The pressure-reducing section 25 has a communication path 25*a* that communicates with the inside and the outside of the second pack 20. The communication path 25*a* is provided in the X-axis direction. The pressure-reducing section 25 is a resin member made of, for example, polypropylene. A cover 25*b* that can open or close the communication path 25*a* is provided at the −X-direction end of the pressure-reducing section 25. In a state in which the cover 25*b* is open, the air inside is sucked out from the outside via the communication path 25*a* to reduce the pressure inside the second pack 20, and the first pack 10 and the second pack 20 thereby come into close contact with each other. In the pressure-reduced state, at least part of the first pack 10 and part of the second pack 20 may be in contact with each other. After the pressure-reducing process, the communication path 25*a* is closed by the cover 25*b*. The cover 25*b* maintains the first pack 10 and the second pack 20 in close contact, and thus the level of the reduced pressure in the ink contained in the first pack 10 can be maintained. If a space exists between the first pack 10 and the second pack 20, the contained ink absorbs the air through the sheet member of the first pack 10, resulting in a decrease in the degree of deaeration. This embodiment, however, suppresses such a problem from occurring. Accordingly, the ink can be stably discharged from the printer.

In contrast, when the cover 25*b* is open, the air is supplied from the outside via the communication path 25*a* into the second pack 20 to pressurize the inside of the second pack 20, and the first pack 10 and the second pack 20 are thereby separated from each other to enable the second pack 20 to be readily opened.

The sheet member of the second pack 20 is made of a flexible material. The sheet member may be a film member made of, for example, polyethylene terephthalate (PET), nylon, or polyethylene. The sheet member may be made of stacked films of the above-described material. The second pack 20 also includes a gas-barrier layer capable of suppressing entry of outside air. The gas-barrier layer is, for example, a vapor-deposited aluminum layer. The gas-barrier layer suppresses entry of air from the outside of the ink pack 1 when the first pack 10 and the second pack 20 are in close contact and thus suppresses a decrease in the degree of deaeration of the ink in the first pack 10. Other than the aluminum layer, the gas-barrier layer may be made of, for example, a gas-barrier resin consisting of a polyvinyl alcohol resin or an ethylene-vinyl alcohol copolymer, such as an ethylene vinyl acetate copolymer saponification, or a vapor-deposited film of a metal or metal oxide deposited onto a resin film of an ethylene-vinyl alcohol copolymer.

Figure 4:
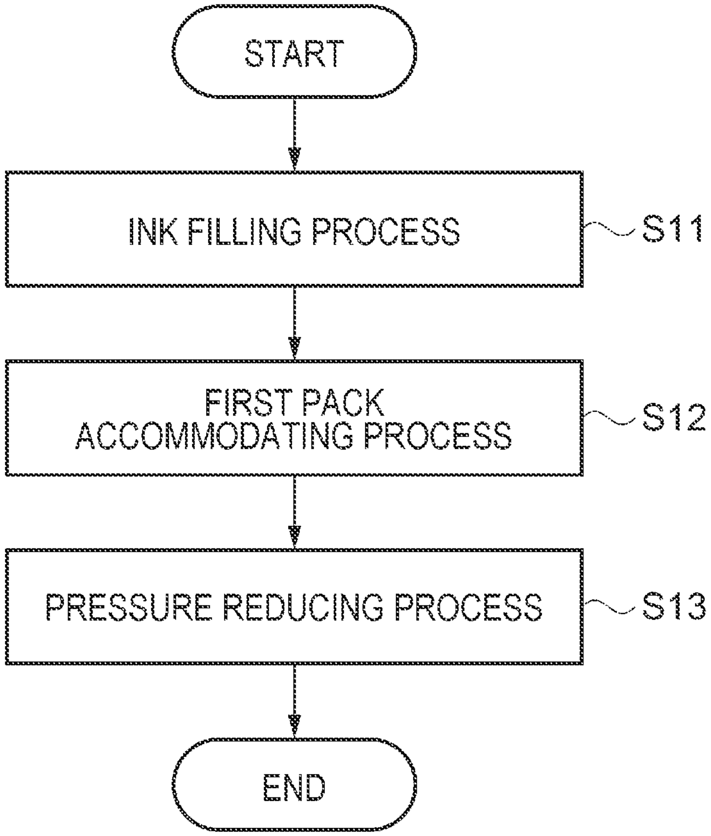
FIG. 4 is a flowchart illustrating a method of manufacturing the ink pack according to the first embodiment.

Next, a method of manufacturing the ink pack 1 is described. In step S11, the first pack 10 is filled with an ink, as in FIG. 4. For example, the air in the first pack 10 is sucked out via the ink supplying section 15 to remove the air. This process reduces the volume of the container 13 in the first pack 10 to substantially zero. After this process, the first pack 10 is filled with an ink via the ink supplying section 15 such that air is not contained. It should be noted that before the ink filling process, the ink may be subjected to deaeration to remove dissolved gas. After a predetermined amount of ink is supplied into the container 13 in the first pack 10, a film member FM is attached to the ink supplying section 15. The film member FM enables the ink to be contained in the first pack 10 in a state in which the first pack 10 is sealed.

Figure 5:
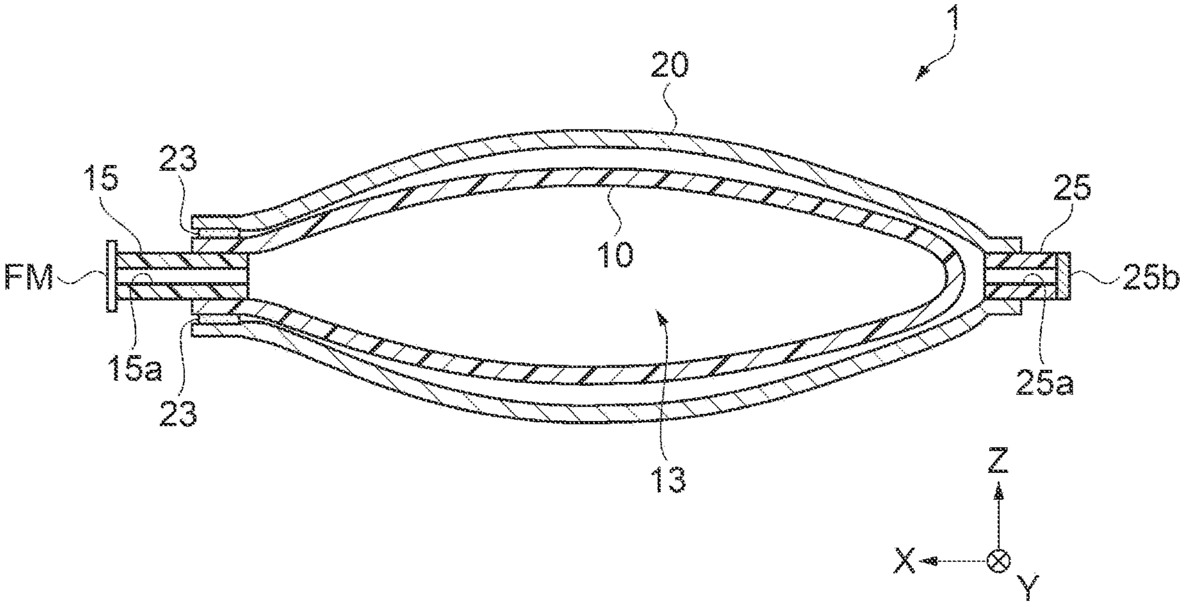
FIG. 5 is a schematic view illustrating a method of manufacturing the ink pack according to the first embodiment.

In step S12, the first pack 10 is wrapped with the second pack 20. More specifically, the whole of the first pack 10 is wrapped with the second pack 20 that is in an open state, and the outer peripheral portion of the second pack 20 is bonded with the double-sided tape 23. By this process, the first pack 10 is accommodated in the second pack 20. In such a state in which the first pack 10 is accommodated in the second pack 20, a space is formed between the first pack 10 and the second pack 20 as illustrated in FIG. 5. When the space is formed between the first pack 10 and the second pack 20, the ink absorbs the air through the sheet member of the first pack 10, and the degree of deaeration of the ink may be decreased.

To solve the problem, in step S13, the pressure inside the second pack 20 is reduced via the pressure-reducing section 25. More specifically, when the cover 25*b* is open, the air in the second pack 20 is sucked out via the communication path 25*a* by using, for example, a pump. This process reduces the pressure in the second pack 20, enabling the first pack 10 and the second pack 20 to come into close contact with each other. The sheet member of the second pack 20 includes the gas-barrier layer, and thus the first pack 10 and the second pack 20 in close contact can maintain the level of the reduced pressure in the ink contained in the first pack 10. After the pressure-reducing process, the communication path 25*a* is closed by the cover 25*b* to be in a closed state. By the above-described processing, the ink pack 1 is provided (FIG. 2).

Next, a method of manufacturing a new ink pack 1 is described. Specifically, a method of manufacturing a new ink pack 1 after the ink pack 1 is used and collected is described. In collecting a used ink pack 1, the used ink pack 1 may be transported without being protected in an individual box and may be damaged during transit. In such a case, in this embodiment, a new ink pack 1 is manufactured by reusing a part of the used ink pack 1.

Figure 6:
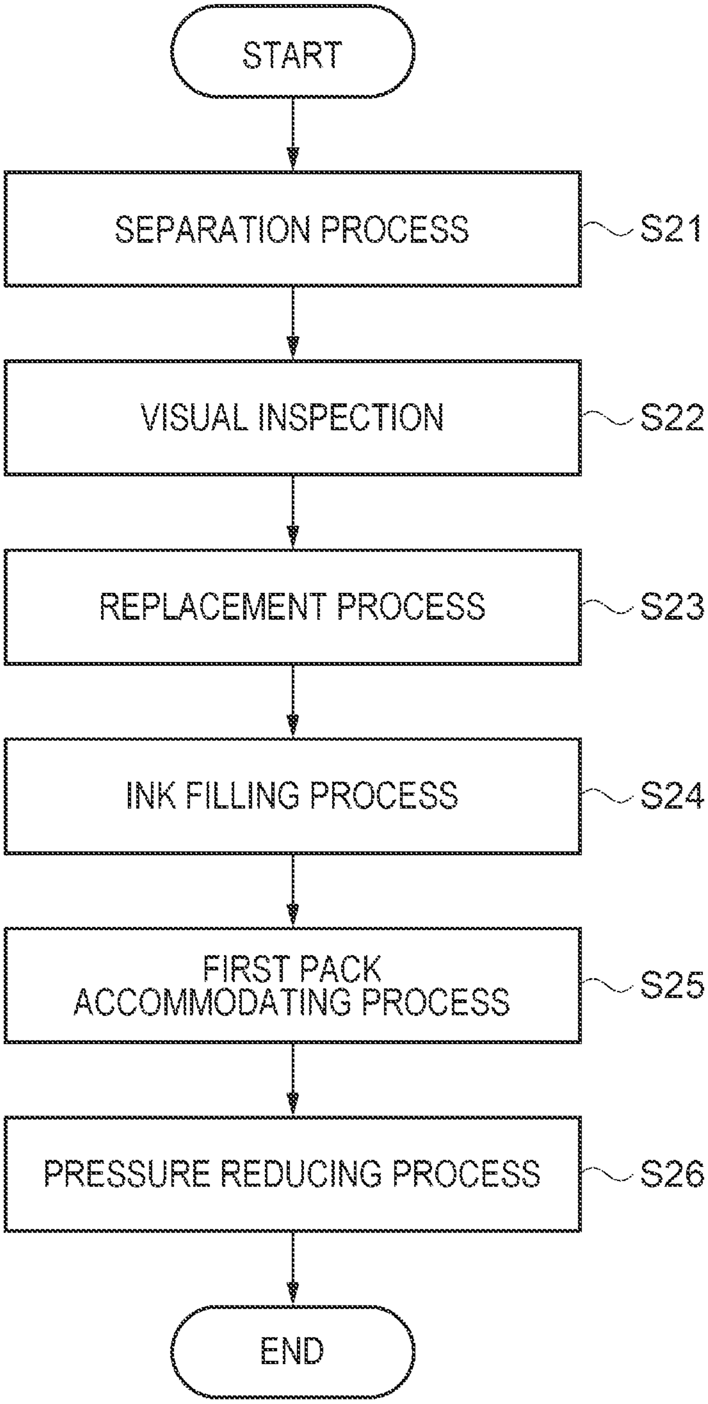
FIG. 6 is a flowchart illustrating a method of manufacturing a new ink pack according to the first embodiment.
Figure 7:
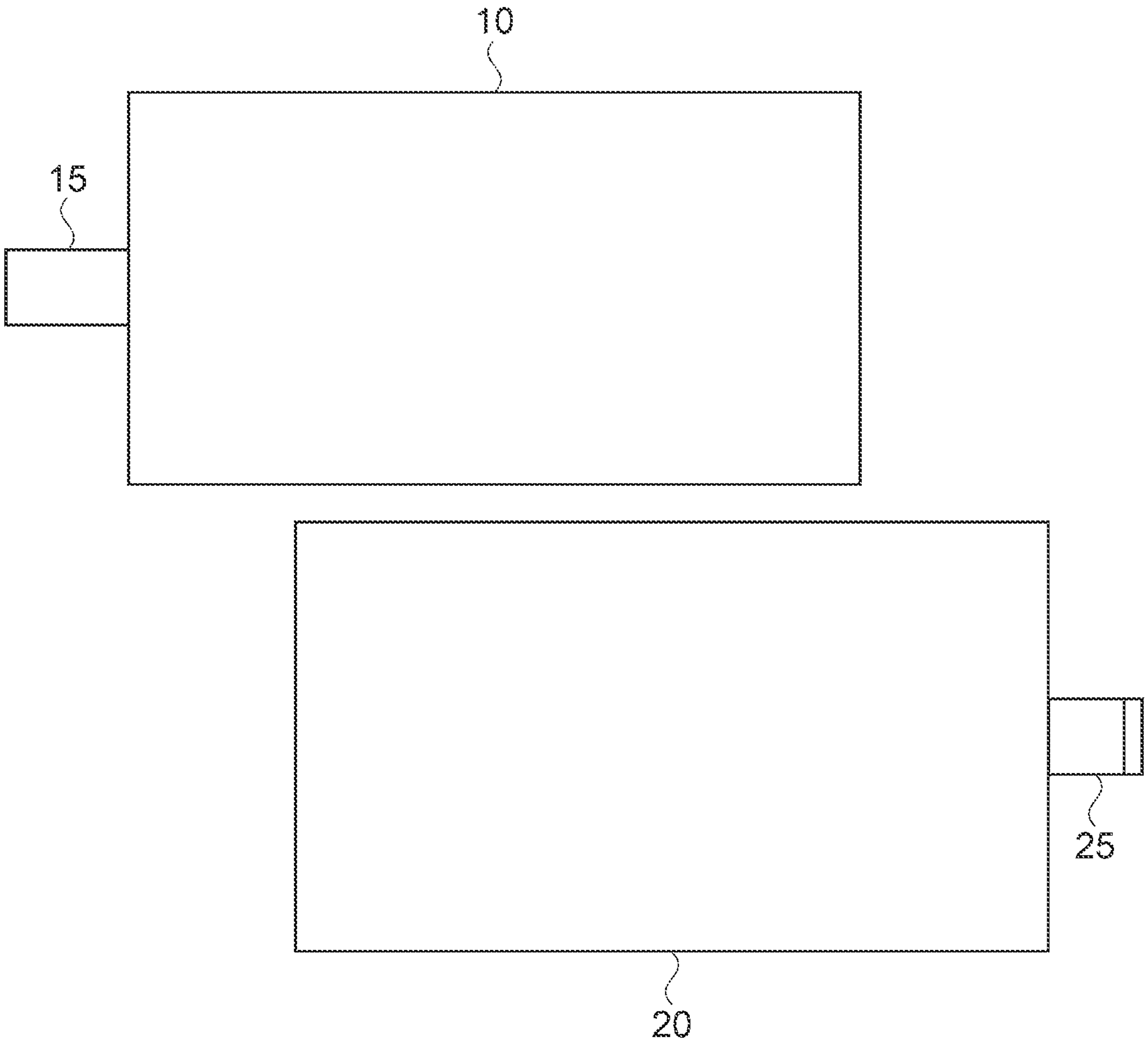
FIG. 7 is a schematic view illustrating a method of manufacturing the new ink pack according to the first embodiment.

In step S21, the collected ink pack 1 is separated, as in FIG. 6. The collected ink pack includes, however, the first pack 10 and the second pack 20 that adhere to each other, and it is difficult to separate the first pack 10 and the second pack 20. In such a state in which the first pack 10 and the second pack 20 adhere to each other, air is injected into a space between the first pack 10 and the second pack 20. More specifically, in a state in which the cover 25*b* is open, air is supplied via the communication path 25*a* into the second pack by using a compressor or the like, thereby pressurizing the inside of the second pack 20 and separating the first pack 10 and the second pack 20 from each other. After the separation, the double-sided tape 23 is removed from the outer peripheral portion of the second pack 20. The first pack 10 and the second pack 20 are separated from each other, and the double-sided tape 23 can be readily removed. By this process, the second pack 20 is opened and the first pack 10 and the second pack 20 are separated from each other as illustrated in FIG. 7.

In step S22, the first pack 10 and the second pack 20 are visually inspected. In the visual inspection, for example, the surface condition (e.g., scratches, dents, and cracks) of the sheet members of the first pack 10 and the second pack 20 is inspected by eye or by using a stereoscopic microscope. Based on the inspection result, whether the first pack 10 or the second pack 20 can be reused is determined, and a selection is made. In the visual inspection, the surface condition may be inspected by touching the first pack 10 and the second pack 20 with fingers.

In step S23, the first pack 10 or the second pack 20 is replaced with a new first pack 10 or a new second pack 20. More specifically, in step S22, for example, when the first pack 10 is reusable and the second pack 20 is not reusable, the second pack 20 that is not reusable is replaced with a new second pack 20, and the new second pack 20 is paired with the reusable first pack 10. In step S22, when the first pack 10 is not reusable and the second pack 20 is reusable, the first pack 10 that is not reusable is replaced with a new first pack 10, and the new first pack 10 is paired with the reusable second pack 20. Hereinafter, a method of manufacturing a new ink pack 1A by using a new second pack 20 and a reusable first pack 10 is described.

In step S24, the first pack 10 is filled with an ink via the ink supplying section 15. After a predetermined amount of ink is supplied into the container 13 in the first pack 10, a film member FM is attached to the ink supplying section 15. The film member FM enables the ink to be contained in a state in which the first pack 10 is sealed.

In step S25, the first pack 10 is accommodated in the new second pack 20. More specifically, the whole of the first pack 10 is wrapped with the new second pack 20 that is in an open state, and the outer peripheral portion of the new second pack 20 is bonded with the double-sided tape 23. This process enables the first pack 10 to be accommodated in the second pack 20.

In step S26, the pressure inside the new second pack 20 is reduced via the pressure-reducing section 25. More specifically, in a state in which the cover 25*b* is open, the air in the new second pack 20 is sucked out via the communication path 25*a* by using, for example, a pump. This process reduces the pressure in the new second pack 20, enabling the reused first pack 10 and the new second pack 20 to come into close contact with each other. After the pressure-reducing process, the communication path 25*a* is closed by the cover 25*b* to be in a closed state. By the above-described processing, the new ink pack 1 is provided.

As described above, according to the embodiment, the ink pack 1 has a double structure, and the first pack 10 containing the ink is protected from external forces by the second pack 20. Accordingly, even if the first pack 10 is damaged, the first pack 10 is covered by the second pack 20, thereby preventing ink leakage from the ink pack 1. In addition, since the first pack 10 and the second pack 20 are separable, for example, even if the first pack 10 or the second pack 20 is damaged while in transit following collection of the used ink pack 1, the damaged first pack 10 or second pack 20 can be replaced with a new pack, and the undamaged pack can be reused. Accordingly, a new ink pack 1 having functions similar to those of new packs can be provided. As a result, the rate of reuse of used ink packs 1 can be increased. In other words, the ink pack 1 according to the embodiment has a function of protecting the pack against external forces and a function of enabling reuse. Thus, the ink pack 1 can be provided without a plastic protective case, thereby reducing the plastic material usage and carbon dioxide emissions.

2. Second Embodiment

Figure 8:
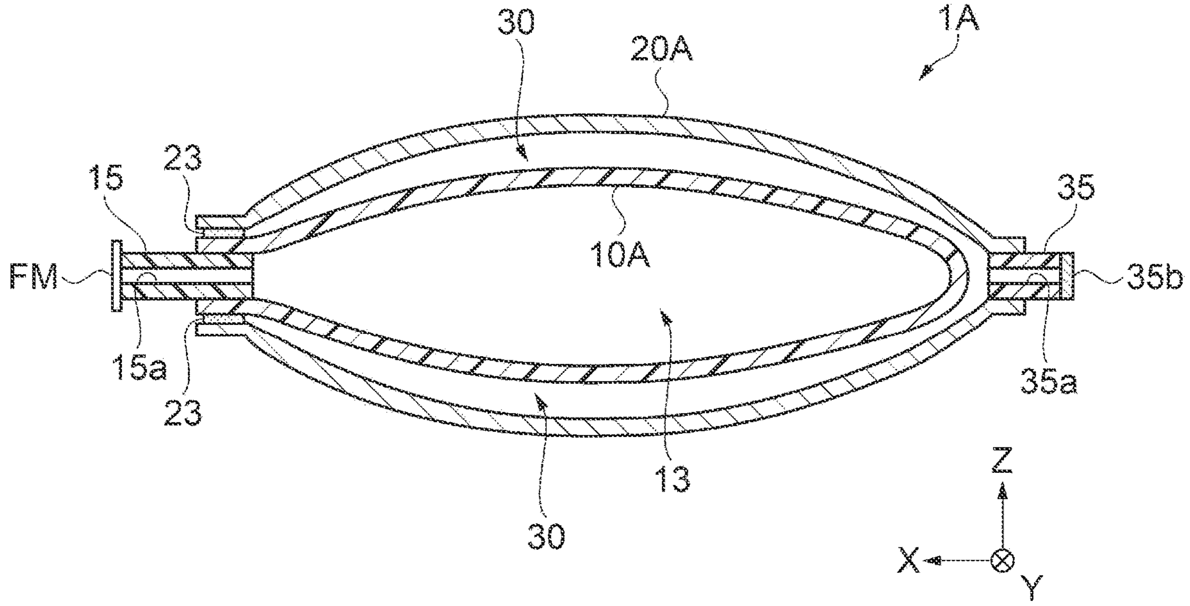
FIG. 8 is a cross-sectional view illustrating an ink pack according to the second embodiment.

Next, a second embodiment is described. To components similar to those in the first embodiment, same reference numerals are given to omit their overlapping descriptions. An ink pack 1A includes a first pack 10A that can contain an ink and a second pack 20A that can accommodate the first pack 10A, as illustrated in FIG. 8.

The first pack 10A is a pouch that has a container 13 inside it to contain an ink. The flexible first pack 10A is made of a sheet member. The first pack 10A according to the embodiment is formed in a pouch shape by folding a sheet member, overlapping the outer peripheral portion at the end in the −Y direction and the outer peripheral portion at the end in the +Y direction, and welding the respective outer peripheries.

The sheet member of the first pack 10A is made of a flexible material. The sheet member may be made of a film member of, for example, polyethylene terephthalate (PET), nylon, or polyethylene. The sheet member may be made of stacked films of the above-described material. For example, the sheet member may include an outer layer made of a high-impact film of PET or nylon and an inner layer made of an ink-resistant film of polyethylene. The first pack 10A also includes a gas-barrier layer capable of suppressing entry of outside air. The gas-barrier layer is, for example, a vapor-deposited aluminum layer. The gas-barrier layer suppresses entry of air from the outside of the first pack 10A, and thus suppresses a decrease in the degree of deaeration of the ink in the first pack 10A.

The second pack 20A is a pouch that accommodates the first pack 10A and is larger than the first pack 10A. The flexible second pack 20A is made of a sheet member.

The ink pack 1A includes the first pack 10A and the second pack 20A, which are separable. The second pack 20A according to the embodiment has two sheet members that overlap each other. More specifically, part of an outer peripheral portion of the second pack 20A is bonded with the double-sided tape 23, which is a removable member. In this embodiment, two sheet members overlap each other, and the outer peripheral portions at the −Y-direction end and the outer peripheral portions at the +Y-direction end are bonded with the double-sided tape 23. At the +X-direction end of the second pack 20A, the front surface of the sheet member of the first pack 10A and the rear surface of the sheet member of the second pack 20A are bonded with the double-sided tape 23.

The second pack 20A has an injection section 35. The injection section 35 according to the embodiment is disposed at the −X-direction end of the second pack 20A. The injection section 35 has a tubular shape. At the −X-direction end of the second pack 20A, the injection section 35 is welded in a state in which the injection section 35 is held between the two sheet members. In the second pack 20A, the portions bonded with the double-sided tapes 23 can be readily removed by pulling the sheet member with fingers. This structure enables the second pack 20A to be readily opened, and thus the first pack 10A and the second pack 20A can be separated.

The injection section 35 is configured such that air can be injected into a space between the first pack 10A and the second pack 20A. The injection section 35 has a communication path 35*a* that communicates with the inside and the outside of the second pack 20A. The communication path 35*a* is provided in the X-axis direction. The injection section 35 is made of a resin member such as polypropylene. A cover 35*b* that can open or close the communication path 35*a* is disposed at the −X-direction end of the injection section 35. In a state in which the cover 35*b* is open, air is injected from the outside via the communication path 35*a* to pressurize the inside of the second pack 20A, and an air layer 30 is thereby formed between the first pack 10A and the second pack 20A. The air is injected into the second pack 20A such that the double-sided tape 23 does not separate. After this process, the communication path 35*a* is closed by the cover 35*b* to be in a closed state. Accordingly, the air layer 30 can be held between the first pack 10A and the second pack 20A. The air layer 30 between the first pack 10A and the second pack 20A can function as a cushioning layer for protecting the first pack 10A when the ink pack 1A is subjected to an external shock.

The air layer 30 between the first pack 10A and the second pack 20A however allows the ink in the first pack 10A to absorb the air through the sheet member, and the degree of deaeration of the ink may be decreased. The first pack 10A according to the embodiment, however, includes the gas-barrier layer, and thus entry of the air into the first pack 10 can be suppressed and a decrease in the degree of deaeration of the ink can be suppressed. Accordingly, the ink can be stably discharged from the printer. In addition, the air layer 30 between the first pack 10A and the second pack 20A enables the second pack 20A to be readily opened.

The sheet member of the second pack 20A is made of a flexible material. The sheet member may be made of a film member of, for example, polyethylene terephthalate (PET), nylon, or polyethylene. The sheet member may be made of stacked films of the above-described material.

Figure 9:
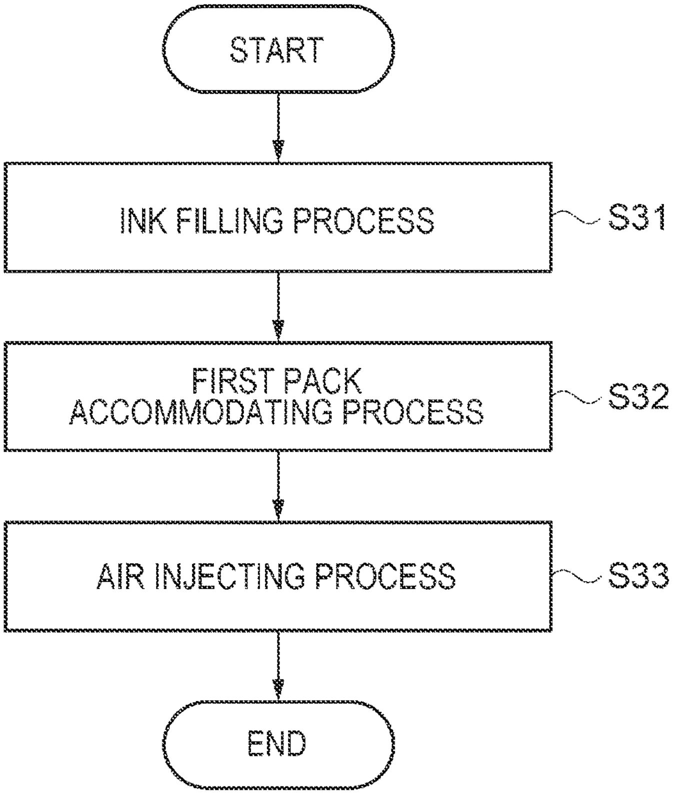
FIG. 9 is a flowchart illustrating a method of manufacturing the ink pack according to the second embodiment.

Next, a method of manufacturing the ink pack 1A is described. In step S31, the first pack 10A is filled with an ink, as in FIG. 9. For example, the air in the first pack 10A is sucked out via the ink supplying section 15 to remove the air. This process reduces the volume of the container 13 in the first pack 10A to substantially zero. After this process, the first pack 10A is filled with an ink via the ink supplying section 15 of the deaerated first pack 10A such that air is not contained. It should be noted that before the ink filling process, the ink may be subjected to deaeration to remove dissolved gas. After a predetermined amount of ink is supplied into the container 13 in the first pack 10A, the film member FM is attached to the ink supplying section 15. The film member FM enables the ink to be contained in a state in which the first pack 10A is sealed.

In step S32, the first pack 10A is accommodated in the second pack 20A. More specifically, the whole of the first pack 10A is wrapped with the second pack 20A that is in an open state, and the outer peripheral portion of the second pack 20A is bonded with the double-sided tape 23. This process enables the first pack 10A to be accommodated in the second pack 20A.

In step S33, air is injected into the second pack 20A via the injection section 35. More specifically, in a state in which the cover 35*b* is open, air is injected into the second pack 20A via the communication path 35*a* by using, for example, a compressor. The air is injected into the second pack 20A such that the double-sided tape 23 does not separate. The air pressurizes the inside of the second pack 20 and forms the air layer 30 between the first pack 10A and the second pack 20A. After this process, the communication path 35*a* is closed by the cover 35*b* to be in a closed state. By the above-described processing, the ink pack 1A is provided (FIG. 8).

Figure 10:
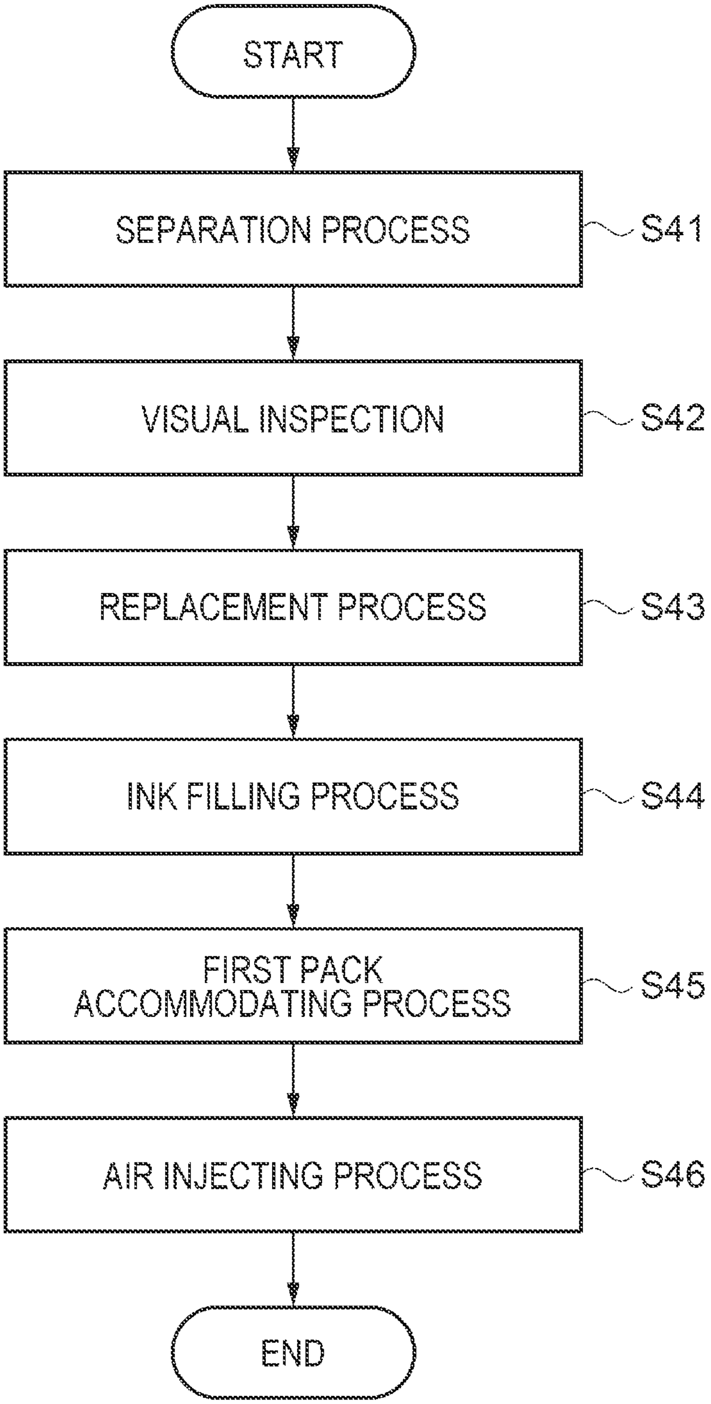
FIG. 10 is a flowchart illustrating a method of manufacturing a new ink pack according to the second embodiment.

Next, a method of manufacturing a new ink pack 1A is described. In step S41, a collected ink pack 1A is separated, as in FIG. 10. More specifically, the double-sided tape 23 on the outer peripheral portion of the second pack 20 is removed, and, thereby, the second pack 20A is opened and the first pack 10A and the second pack 20A are separated from each other.

In step S42, the first pack 10A and the second pack 20A are visually inspected. In the visual inspection, for example, the surface condition (e.g., scratches, dents, and cracks) of the sheet members of the first pack 10A and the second pack 20A is inspected visually or by using a stereoscopic microscope. Based on the inspection result, whether the first pack 10A or the second pack 20A can be reused is determined and selection is performed. In the visual inspection, the surface condition may be inspected by touching the first pack 10A and the second pack 20A with fingers.

In step S43, the first pack 10A or the second pack 20A is replaced with a new first pack 10A or a new second pack 20A. More specifically, in step S42, for example, when the first pack 10A is reusable and the second pack 20A is not reusable, the second pack 20A that is not reusable is replaced with a new second pack 20A, and the new second pack 20A is paired with the reusable first pack 10A. In step S42, when the first pack 10A is not reusable and the second pack 20A is reusable, the first pack 10A that is not reusable is replaced with a new first pack 10A, and the new first pack 10A is paired with the reusable second pack 20A. Hereinafter, a method of manufacturing a new ink pack 1A by using a new second pack 20A and a reusable first pack 10A is described.

In step S44, the first pack 10A is filled with an ink via the ink supplying section 15. After a predetermined amount of ink is supplied into the container 13 in the first pack 10A, the film member FM is attached to the ink supplying section 15. The film member FM enables the ink to be contained in a state in which the first pack 10A is sealed.

In step S45, the first pack 10A is accommodated in the new second pack 20A. More specifically, the whole of the first pack 10A is wrapped with the new second pack 20A in an open state, and the outer peripheral portion of the new second pack 20A is bonded with the double-sided tape 23. This process enables the first pack 10A to be accommodated in the new second pack 20A.

In step S46, air is injected into the new second pack 20A via the injection section 35. More specifically, in a state in which the cover 35*b* is open, air is injected into the new second pack 20A via the communication path 35*a* by using, for example, a compressor. The air is injected into the second pack 20A such that the double-sided tape 23 does not separate. The air pressurizes the inside of the second pack 20A and forms the air layer 30 between the first pack 10A and the second pack 20A. After this process, the communication path 35*a* is closed by the cover 35*b* to be in a closed state. By the above-described processing, the new ink pack 1A is provided.

As described above, according to the embodiment, the ink pack 1A includes the air layer 30 between the first pack 10A and the second pack 20A, and the first pack 10A containing the ink is protected from external forces by the air layer 30. In addition, since the first pack 10A and the second pack 20A are separable, for example, even if the first pack 10A or the second pack 20A is damaged while the used ink pack 1A is collected and transported, the damaged first pack 10A or second pack 20A can be replaced with a new pack, and the undamaged pack can be reused. Accordingly, a new ink pack 1A that has functions similar to those of new packs can be provided. In other words, the ink pack 1A according to the embodiment has a function of protecting the pack against external forces and a function of enabling reuse. Thus, the ink pack 1A can be provided without a plastic protective case, thereby reducing the plastic material usage and carbon dioxide emissions.

What is claimed is:

1. An ink pack configured to supply an ink to an ink-consuming apparatus, the ink pack comprising:
- a first pack configured to contain the ink;
- an ink supplying section provided to the first pack, the ink supplying section being configured to supply the ink to the ink-consuming apparatus; and
- a second pack configured to accommodate the first pack, wherein
- the first bag is configured to be removable from the second bag, and
- the second bag is configured to open up for the first bag to be moved outside the second bag.

2. The ink pack according to claim 1, wherein
- the second pack is provided with a pressure-reducing section configured to reduce the pressure in a space between the first pack and the second pack, and
- the first pack and the second pack are configured to come into close contact with each other when the pressure is reduced via the pressure-reducing section.

3. The ink pack according to claim 2, wherein
- the second pack includes a gas-barrier layer configured to suppress entry of outside air.

4. The ink pack according to claim 1, wherein
- the second pack is provided with an injection section configured to inject air into a space between the first pack and the second pack, and
- an air layer is formed between the first pack and the second pack by injecting air via the injection section.

5. The ink pack according to claim 4, wherein
- the first pack includes a gas-barrier layer configured to suppress entry of outside air.

6. The ink pack according to claim 1, wherein
- an outer peripheral portion of the second pack is bonded with a removable member.

7. A method of manufacturing an ink pack including a first pack configured to contain an ink, an ink supplying section provided to the first pack, the ink supplying section being configured to supply ink to the an ink-consuming apparatus, and a second pack configured to accommodate the first pack, the first bag being configured to be removable from the second bag, the second bag being configured to open up for the first bag to be moved outside the second bag, the method comprising:
- removably accommodating the first pack filled with the ink by using the second pack; and
- reducing the pressure in a space between the first pack and the second pack such that the first pack and the second pack come into close contact with each other.

8. A method of manufacturing a new ink pack by reusing a part of the ink pack manufactured in accordance with the manufacturing method according to claim 7, the method comprising:
- in a state in which the first pack and the second pack are in close contact, injecting air into a space between the first pack and the second pack to separate the first pack and the second pack;
- separating the first pack and the second pack from each other; and
- replacing the first pack or the second pack with a new first pack or a new second pack.

9. A method of manufacturing an ink pack including a first pack configured to contain an ink, an ink supplying section provided to the first pack, the ink supplying section being configured to supply the ink to an ink-consuming apparatus, and a second pack configured to accommodate the first pack, the first bag being configured to be removable from the second bag, the second bag being configured to open up for the first bag to be moved outside the second bag, the method comprising:
- removably accommodating the first pack filled with the ink by using the second pack; and
- injecting air into a space between the first pack and the second pack to form an air layer between the first pack and the second pack.

10. A method of manufacturing a new ink pack by reusing a part of the ink pack manufactured in accordance with the manufacturing method according to claim 9, the method comprising:

separating the first pack and the second pack from each other; and replacing the first pack or the second pack with a new first pack or a new second pack.

* * * * *